(12) United States Patent
Sodaro et al.

(10) Patent No.: US 11,066,999 B2
(45) Date of Patent: Jul. 20, 2021

(54) FUEL COOLED COOLING AIR

(71) Applicant: United Technologies Corporation, Farmington, CT (US)

(72) Inventors: Joseph J. Sodaro, Manchester, CT (US); Thomas G. Phillips, Coventry, CT (US); Edmund E. Rochford, West Hartford, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 255 days.

(21) Appl. No.: 16/249,056

(22) Filed: Jan. 16, 2019

(65) Prior Publication Data
US 2020/0224591 A1   Jul. 16, 2020

(51) Int. Cl.
*F02C 7/18*   (2006.01)
*F02C 6/08*   (2006.01)
(Continued)

(52) U.S. Cl.
CPC ............... *F02C 7/185* (2013.01); *F02C 6/08* (2013.01); *F02C 7/141* (2013.01); *F02C 7/22* (2013.01);
(Continued)

(58) Field of Classification Search
CPC ............ B64D 13/02; B64D 2013/0603; B64D 2013/0648; F02C 7/141; F02C 7/16; F02C 7/18; F02C 7/185; F02C 7/22; F02C 7/224; F02C 6/08; F05D 2260/213; F05D 2260/232

See application file for complete search history.

(56) References Cited

U.S. PATENT DOCUMENTS 5,036,678 A * 8/1991 Renninger ............. B64D 13/06
                                                       62/402
5,317,877 A * 6/1994 Stuart .................... F02C 7/224
                                                       60/736

(Continued)

FOREIGN PATENT DOCUMENTS

EP        3296543 A1    3/2018

OTHER PUBLICATIONS

Partial European Search Report for EP Application No. 20152300.8 dated Feb. 16, 2021.

(Continued)

*Primary Examiner* — Scott J Walthour
(74) *Attorney, Agent, or Firm* — Carlson, Gaskey & Olds, P.C.

(57) ABSTRACT

A gas turbine engine includes a main compressor section having a downstream most location, and a cooling air tap at a location upstream of the downstream most location. A main turbine section, each of the main turbine section and the main compressor section are mounted within a housing, and each have rotatable components. A first heat exchanger is connected to the cooling air tap. The first heat exchanger is also connected to receive fuel to be supplied to a combustor in the gas turbine engine, and such that the fuel may cool the cooling air in the first heat exchanger. A boost compressor is connected to receive air downstream of the first heat exchanger and connected to deliver the cooling air to at least one of the rotatable components in at least one of the compressor and turbine sections.

12 Claims, 2 Drawing Sheets

(51) Int. Cl.
*F02C 7/141* (2006.01)
*F02C 7/22* (2006.01)

(52) U.S. Cl.
CPC .. *F05D 2220/323* (2013.01); *F05D 2260/213* (2013.01); *F05D 2260/232* (2013.01)

(56) References Cited

U.S. PATENT DOCUMENTS

| | | | |
|---|---|---|---|
| 5,392,614 A * | 2/1995 | Coffinberry | F02C 7/12 |
| | | | 62/402 |
| 5,414,992 A | 5/1995 | Glickstein | |
| 5,918,458 A | 7/1999 | Coffinberry et al. | |
| 6,250,061 B1 * | 6/2001 | Orlando | F02C 3/13 |
| | | | 60/772 |
| 6,415,595 B1 | 7/2002 | Wilmot, Jr. et al. | |
| 10,006,370 B2 | 6/2018 | Suciu et al. | |
| 10,100,739 B2 | 10/2018 | Kupratis et al. | |
| 2005/0252193 A1 | 11/2005 | Iya et al. | |
| 2009/0072044 A1 * | 3/2009 | Kehret | F02K 1/1223 |
| | | | 239/13 |
| 2015/0275769 A1 * | 10/2015 | Foutch | F02C 7/27 |
| | | | 60/776 |
| 2018/0080383 A1 | 3/2018 | Snape | |

OTHER PUBLICATIONS

Partial European Search Report for EP Application No. 20152300.8 dated Oct. 1, 2020.

* cited by examiner

FUEL COOLED COOLING AIR

BACKGROUND

This application relates to a gas turbine engine having a cooling air supply cooled by a fuel being delivered for use on the gas turbine engine.

Gas turbine engines are known and typically include a fan delivering air into a bypass duct as propulsion air. The fan also delivers air into a core engine, which includes a compressor compressing the air and delivering into a combustor. The air is mixed with fuel and ignited in the combustor and products of the combustion pass downstream over turbine rotors driving them to rotate.

As can be appreciated, sections of the compressor and the turbine section experience heat challenges. Thus, it is known to provide cooling air to those locations.

SUMMARY

In a featured embodiment, a gas turbine engine includes a main compressor section having a downstream most location, and a cooling air tap at a location upstream of the downstream most location. A main turbine section, each of the main turbine section and the main compressor section are mounted within a housing, and each have rotatable components. A first heat exchanger is connected to the cooling air tap. The first heat exchanger is also connected to receive fuel to be supplied to a combustor in the gas turbine engine, and such that the fuel may cool the cooling air in the first heat exchanger. A boost compressor is connected to receive air downstream of the first heat exchanger and connected to deliver the cooling air to at least one of the rotatable components in at least one of the compressor and turbine sections.

In another embodiment according to the previous embodiment, a second heat exchanger is mounted downstream of the boost compressor.

In another embodiment according to any of the previous embodiments, the fuel is connected downstream of the first heat exchanger to the second heat exchanger to further cool the cooling air in the second heat exchanger.

In another embodiment according to any of the previous embodiments, the cooling air is supplied to cool a high pressure turbine in the turbine section.

In another embodiment according to any of the previous embodiments, a high pressure tap taps air downstream of the downstream most location as power air in the main compressor section and the second tap is provided across a first boost turbine. The first boost turbine expands the power air.

In another embodiment according to any of the previous embodiments, the air downstream of the first boost turbine is supplied to cool a low pressure turbine in the main turbine section.

In another embodiment according to any of the previous embodiments, a second boost turbine receives a portion of the air downstream of the first boost turbine, and further serves to drive the boost compressor.

In another embodiment according to any of the previous embodiments, the air expanded across the second boost turbine section is supplied to an exhaust nozzle for cooling the exhaust nozzle.

In another embodiment according to any of the previous embodiments, the cooling air is supplied to cool a high pressure turbine in the turbine section.

In another embodiment according to any of the previous embodiments, a high pressure tap taps air downstream of the downstream most location as power air in the main compressor section and the second tap is provided across a first boost turbine. The first boost turbine expands the power air.

In another embodiment according to any of the previous embodiments, the air downstream of the first boost turbine is supplied to cool a low pressure turbine in the main turbine section.

In another embodiment according to any of the previous embodiments, a second boost turbine receives a portion of the air downstream of the first boost turbine, and further serves to drive the boost compressor.

In another embodiment according to any of the previous embodiments, the air expanded across the second boost turbine section is supplied to an exhaust nozzle for cooling the exhaust nozzle.

In another embodiment according to any of the previous embodiments, a high pressure tap taps air downstream of the downstream most location as power air in the main compressor section and the second tap is provided across a first boost turbine. The first boost turbine expands the power air.

In another embodiment according to any of the previous embodiments, a second boost turbine receives a portion of the air downstream of the first boost turbine and further serves to drive the boost compressor.

In another embodiment according to any of the previous embodiments, a control controls a volume of air delivered to the second boost turbine, and a volume of air delivered to the at least one of the rotatable components in at least one of the compressor and turbine sections.

In another embodiment according to any of the previous embodiments, a fixed orifice separates the volume of air delivered to the second boost turbine and delivered to the at least one of the rotatable components in the at least one of the main compressor section and the main turbine section.

In another featured embodiment, a gas turbine engine includes a main compressor section having a downstream most location and a cooling air tap at a location upstream of the downstream most location. A main turbine section, each of the main turbine section and the main compressor section are mounted within a housing, and each have rotatable components. There is a means for supplying fuel to a combustor in the gas turbine engine. There is also a means for cooling the cooling air and delivering the cooling air to at least one of the rotatable component. The means includes at least one heat exchanger in which the cooling air is cooled by fuel from the means to supply fuel.

These and other features may be best understood from the following drawings and specification.

DETAILED DESCRIPTION

Figure 1:
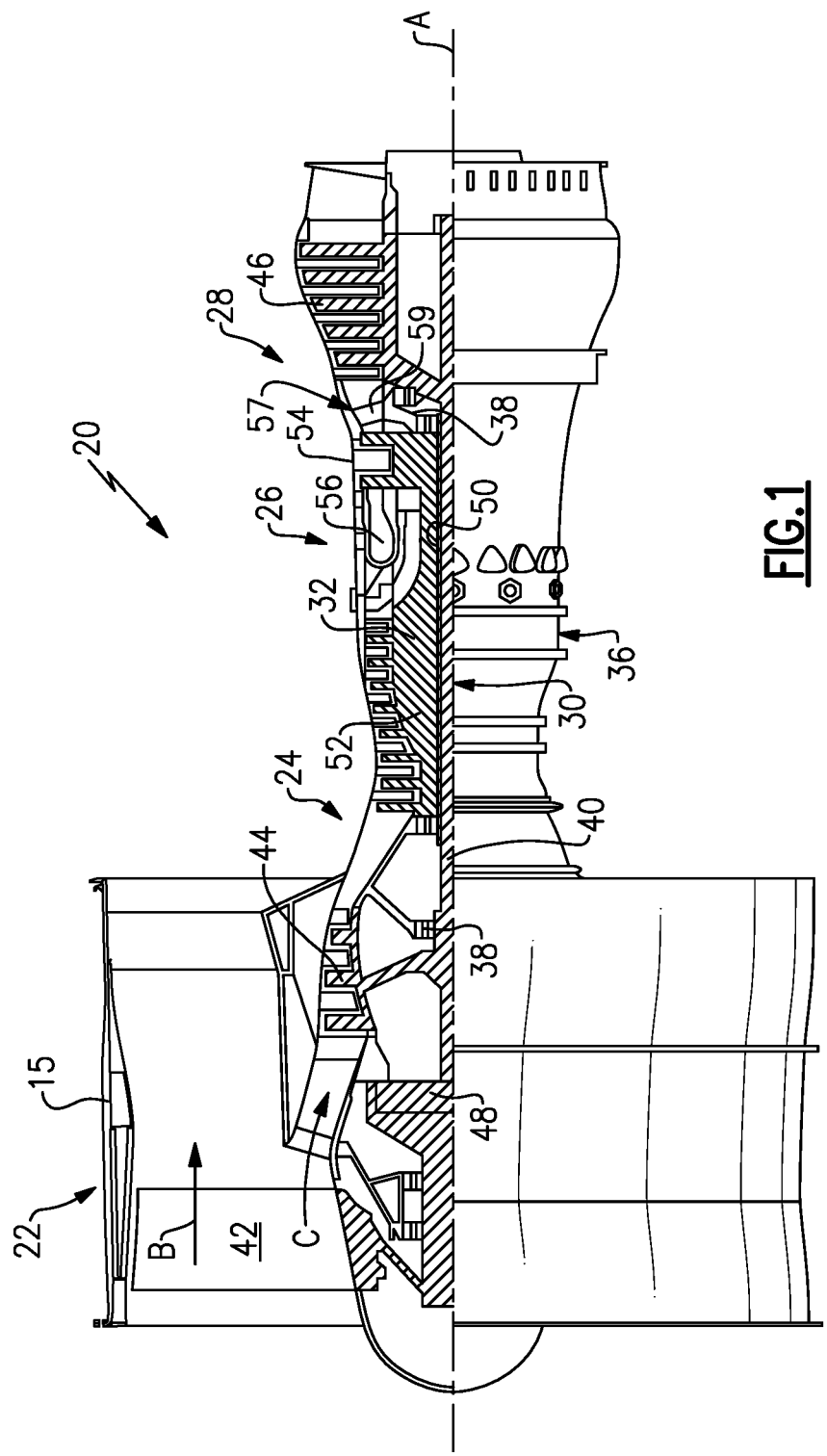
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
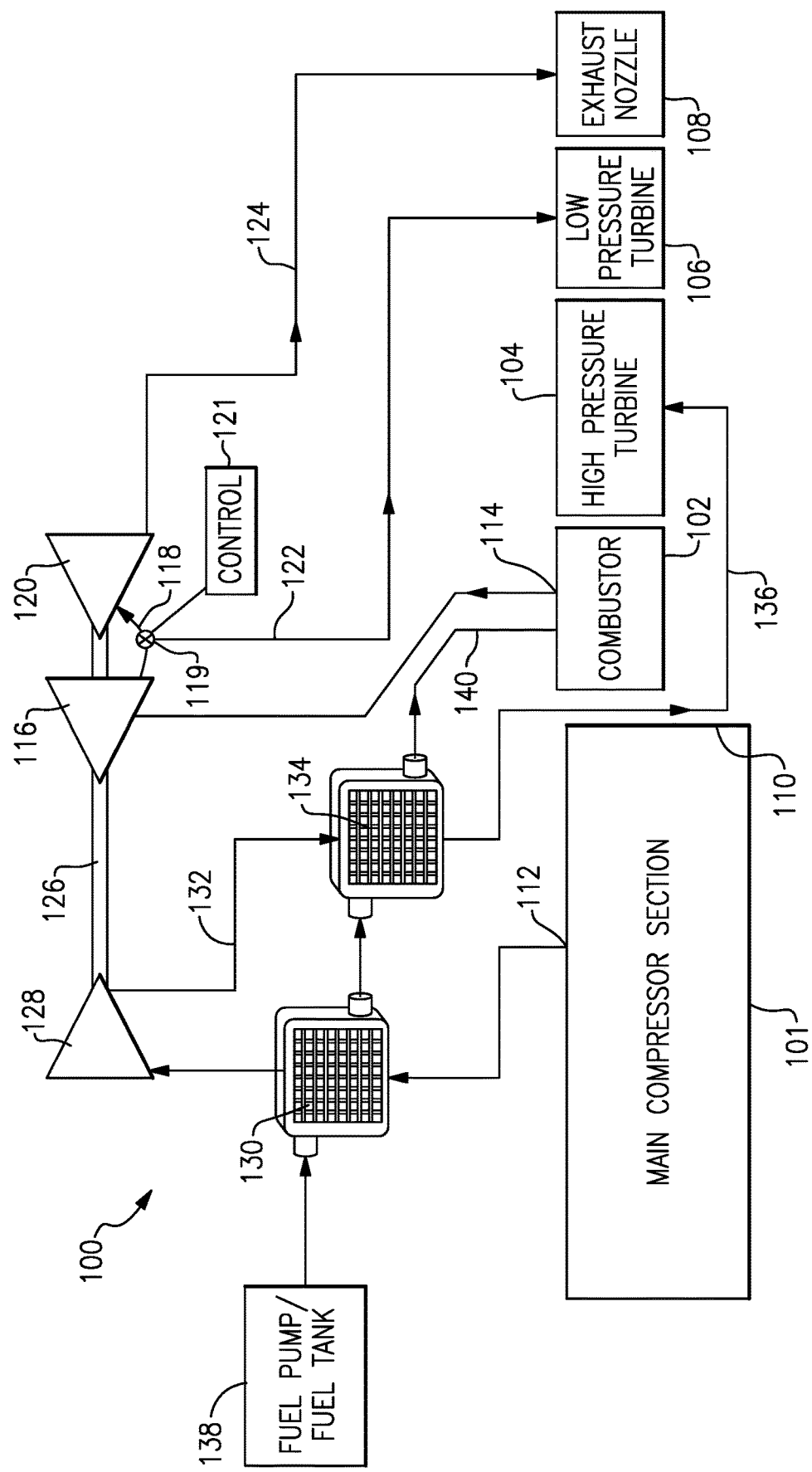
FIG. 2 schematically shows an interconnected fuel and cooling air supply system.

FIG. 2 shows an engine 100, which may generally operate as the FIG. 1 engine. A main compressor section 101 is shown schematically and may include a low and a high pressure compressor such as in FIG. 1. A combustor 102 is downstream of the compressor section 101. A high pressure turbine 104 is downstream of the combustor. A low pressure turbine 106 is downstream of the high pressure turbine 104. An exhaust nozzle 108 is downstream of the low pressure turbine 106. A downstream most end 110 in the compressor section may be defined.

Air is tapped at 112 and at a location which is upstream of the most downstream location 110. By tapping the air at location 112, the air has not been compressed as completely as it would be if tapped downstream of location 110. This air will be utilized for cooling purposes and tapping the air from the upstream location improves the efficiency of the engine as this air has not been compressed fully as it would be downstream of location 110. Air may alternatively be tapped downstream of location 110.

Air is also tapped at 114 and from a location downstream of the downstream most location 110. The fully compressed air at tap 114 may be tapped from a diffuser outwardly of the combustor 102, however, other locations may also be considered. This highly compressed air is passed across a first stage boost turbine 116. The air is expanded and drives the first stage boost turbine 116 to rotate. Downstream of the boost turbine stage 116, the air splits into a line 118 leading to a second boost turbine stage 120. This air expands across the second boost turbine stage 120 and the combination of turbines 116 and 120 drive a shaft 126 to, in turn, drive a boost compressor 128.

The split is shown schematically with a valve 119 controlled by a control 121. The control 121 could be part of a full authority digital engine controller (FADEC) or a stand-alone controller, and is programmed to achieve the goals of the designer for splitting the volume of air directed into lines 122 and 124. Alternatively, a fixed splitter could be utilized, such as a fixed orifice.

Air downstream of the first stage boost turbine boost 116 also passes into a line 122 and is utilized to cool the low pressure turbine 106. The air downstream of the second stage turbine 120 passes into a line 124 and cools the nozzle 108.

Gas turbine engines, which incorporate a gear reduction driving the fan, are providing higher overall pressure ratios across the compressor section. As this occurs, the temperature of the compressed air increases such that the air may be too hot to provide sufficient cooling without itself being cooled. At the same time, there are increased challenges at the high pressure turbine and, for that matter, a downstream end of a high pressure compressor adjacent to the downstream end 110. As such, the air tapped at 112 is passed through a first heat exchanger 130. This air then passes across the boost compressor 128 and its pressure is increased. The air then passes into a line 132 leading to an optional second heat exchanger 134. Downstream of the second heat exchanger 134, the air passes back into the core of the gas turbine engine. As shown schematically at 136, it may be utilized to cool the high pressure turbine 104. It could be said that this cooling air is utilized to cool at least one rotating element in at least one of a high pressure compressor and a high pressure turbine.

In the past, it has generally been proposed to cool such cooling airflow with bypass air, or other air utilized as a cooling fluid to cool the air being supplied to line 136.

However, in this disclosure, fuel heading to the combustor 102 is utilized to cool the cooling air. Thus, a fuel pump and fuel tank 138 are shown and fuel passes first through the heat exchanger 130, and then into the heat exchanger 134 before passing to the combustor 102. It is known to utilize fuel to cool other fluids in a gas turbine engine, however, it has generally not been proposed to utilize fuel to cool cooling air. The hot cooling air from the tap 112 heats the fuel, which is beneficial to the efficiency of combustion in the combustor 102. At the same time, the fuel then cools the cooling air such that it can operate beneficially for cooling its ultimate destinations.

A gas turbine engine could be said to include a main compressor section having a downstream most location and a cooling air tap at a location upstream of the downstream most location. There is a main turbine section. Each of the main turbine section and the main compressor section are mounted within a housing, and each having rotatable components. There are means for supplying fuel to a combustor in the gas turbine engine. There are also means for cooling the cooling air and delivering the cooling air to at least one of the rotatable components. The means includes at least one heat exchanger in which the cooling air is cooled by fuel from the means to supply fuel.

As one benefit of utilizing fuel as the cooling medium for the cooling air, fuel has a high density and high specific heat value. This will allow the size of the heat exchangers 130 and 134 to be smaller compared to air/air heat exchangers as may have been utilized in the past.

While the application has been generally illustrated in what might be considered a commercial engine application, benefits of this cooling scheme would also extend to military applications.

A gas turbine engine could be said to include a main compressor section having a downstream most location and a cooling air tap at a location upstream of the downstream most location. A main turbine section, each of the main turbine section and the main compressor section mounted within a housing, and each having rotatable components. There is a means for supplying fuel to a combustor in the gas turbine engine. There is also a means for cooling the cooling air and delivering the cooling air to at least one of the rotatable component. The means includes at least one heat exchanger in which the cooling air is cooled by fuel from the means to supply fuel.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A gas turbine engine comprising:
   a main compressor section having a downstream most location, and a cooling air tap at a location upstream of the downstream most location to tap cooling air;
   a main turbine section, each of said main turbine section and said main compressor section mounted within a housing, and each having rotatable components;
   a first heat exchanger connected to said cooling air tap, said first heat exchanger also connected to receive fuel to be supplied to a combustor in said gas turbine engine such that said fuel cools said cooling air in said first heat exchanger;
   a boost compressor connected to receive the cooling air downstream of said first heat exchanger and connected to deliver the cooling air to at least one first rotatable component of the rotatable components in at least one of said compressor section and said turbine section;
   a high pressure tap for tapping air downstream of said downstream most location as power air, said high pressure tap being connected to provide said power air across a first boost turbine, said first boost turbine configured to expand the power air;
   a second boost turbine connected by a first line to receive and expand a first portion of air from said first boost turbine and configured to drive said boost compressor; and
   a second line connected to receive a second portion of air from said first boost turbine and configured to deliver the second portion of air downstream of said first boost turbine to a second rotatable component of the rotatable components.

2. The gas turbine engine as set forth in claim 1, wherein a second heat exchanger is mounted downstream of said boost compressor.

3. The gas turbine engine as set forth in claim 2, wherein said fuel is routed downstream of said first heat exchanger to said second heat exchanger to further cool said cooling air in said second heat exchanger.

4. The gas turbine engine as set forth in claim 3, wherein said cooling air is supplied to cool a high pressure turbine in said turbine section.

5. The gas turbine engine as set forth in claim 4, wherein said second of the rotatable components is a low pressure turbine in said main turbine section.

6. The gas turbine engine as set forth in claim 5, wherein said first portion of air expanded across the second boost turbine section is supplied to an exhaust nozzle for cooling said exhaust nozzle.

7. The gas turbine engine as set forth in claim 1, wherein said at least one first rotatable component of the rotatable components is a high pressure turbine in said turbine section.

8. The gas turbine engine as set forth in claim 1, wherein said second rotatable component of the rotatable components is a low pressure turbine in said main turbine section.

9. The gas turbine engine as set forth in claim 8, wherein said first portion of air expanded across the second boost turbine section is supplied to an exhaust nozzle for cooling said exhaust nozzle.

10. The gas turbine engine as set forth in claim 1, wherein said first portion of air expanded across the second boost turbine section is supplied to an exhaust nozzle for cooling said exhaust nozzle.

11. The gas turbine engine as set forth in claim 1, wherein a fixed orifice separates a volume of said first portion of air delivered to said second boost turbine and a volume of said second portion of air delivered to said second rotatable component of the rotatable components.

12. The gas turbine engine as set forth in claim 1, wherein said control is programmed to control said volume of said first portion of air delivered to said second boost turbine and said volume of said second portion of air delivered to said second rotatable component of the rotatable components.

\* \* \* \* \*